US005484857A

United States Patent [19]
Weider et al.

[11] Patent Number: 5,484,857
[45] Date of Patent: Jan. 16, 1996

[54] SINGLE-STAGE PROCESS FOR THE PREPARATION OF POLYISOBUTYLENE CARBOXYLIC ACIDS

[75] Inventors: Richard Weider, Leverkusen; Thomas Scholl, Bergisch Gladbach; Burkhard Köhler, Krefeld; Bernhard Jansen, Cologne, all of Germany

[73] Assignee: Bayer Aktiengesellschaft, Leverkusen, Germany

[21] Appl. No.: 372,928

[22] Filed: Jan. 17, 1995

[30] Foreign Application Priority Data

Jan. 26, 1994 [DE] Germany .......................... 44 02 188.7

[51] Int. Cl.⁶ ....................................... C08F 8/06
[52] U.S. Cl. .................... 525/388; 525/332.8; 525/333.8
[58] Field of Search ................................................ 525/388

[56] References Cited

U.S. PATENT DOCUMENTS

| 3,890,293 | 6/1975 | Yukuta et al. | 525/388 |
| 3,964,324 | 6/1976 | Gassner et al. | 525/388 |
| 4,336,356 | 6/1982 | Aharoni et al. | 525/388 |
| 5,262,489 | 11/1993 | White et al. | 525/388 |
| 5,434,221 | 7/1995 | White et al. | 525/388 |

*Primary Examiner*—Bernard Lipman
*Attorney, Agent, or Firm*—Connolly & Hutz

[57] ABSTRACT

The present invention relates to a single-stage process for the preparation of polyisobutylene carboxylic acids from isobutylene-diene copolymers, which are optionally crosslinked or branched by means of a diolefine in the known manner, by reaction with ozone in the presence of a solvent.

5 Claims, No Drawings

SINGLE-STAGE PROCESS FOR THE PREPARATION OF POLYISOBUTYLENE CARBOXYLIC ACIDS

The present invention relates to a process for the preparation of polyisobutylene carboxylic acids with average molecular weights Mn (number average molecular weight, determined by gel permeation chromatography) from 300 to 20,000, preferably from 1000 to 15,000, and with a content of carboxylic acid groups between 0.5 moles and 5 moles, preferably between 0.8 moles and 5 moles, based on 1 mole of polyisobutylene carboxylic acid, which is characterized in that high molecular weight isobutylene diene copolymers with Mn>20,000, which contain 0.3 mole % to 15 mole %, preferably 0.5 mole % to 10 mole %, of polymerized-in diene per mole of isobutylene monomer, and which are optionally crosslinked or branched by means of a diolefine in the known manner, are reacted with 0.3 mole % to 50 mole %, preferably with 0.5 mole % to 30 mole %, of ozone per mole of isobutylene at temperatures from −100° C. to +70° C, preferably from −20° C. to +30° C., with reaction times from a few seconds to 10 hours being maintained, in the presence of a solvent for the polyisobutylene carboxylic acid which is formed.

The polyisobutylene carboxylic acids obtained in this manner have acid numbers between 2 and 250, preferably between 5 and 100, and most preferably between 5 and 60. They contain no more than 5 carboxyl groups per molecule.

The unbranched polyisobutylene carboxylic acids obtainable according to the invention are known in principle, and can be used for organic synthesis, for example as components of polymers, or as additives, for example as plasticizers in rubbers.

The branched or crosslinked polyisobutylene carboxylic acids are not known.

The present invention thus also relates to crosslinked or branched polyisobutylene carboxylic acids which can be obtained by the process of the present invention. These new polyisobutylene carboxylic acids can be also used industrially, just like those which are already known.

The oxidation of unsaturated polyolefines with ozone in a multistage process for the production of polyolefines containing —OH or —COOH groups is known from U.S. Pat. No. 3,392,154.

A multistage process comprising the ozonolysis of an isobutylene-isoprene copolymer is likewise known from U.S. Pat. No. 3,427,351. The products obtained are polyolefine carboxylic acids with terminal bis-carboxyl groups.

A process for the preparation of isoolefine polymers containing carboxyl groups is known from DE-OS 2 147 874. Preparation with ozone is likewise effected as a multistage process.

Oxidation with ozone is also known from FR 2 235 952. PVC, polychlorinated polyethylene and similar chlorinated polymers are oxidized.

European Patent Application 0 012 316 describes a procedure for the preparation of saturated polymers containing terminal carboxyl or hydroxyl groups by the ozonolysis of a solution of an olefine copolymer containing a diene in a special solvent mixture at elevated temperature and subsequent cleavage of the ozonide by oxidation by means of a second oxidizing agent (page 19, lines 25 et seq.), preferably peroxyacids at an elevated temperature (page 20, lines 15 et seq.), to form carboxyl groups, and/or reduction by means of complex hydrides to form hydroxyl groups. A second oxidation step and purification of the product by precipitation in methanol and washing are also necessary here (page 20, lines 19 et seq.). This process is thus also expensive and moreover involves a high risk of explosion, since the temperatures which are necessary both for ozonolysis and for oxidation are close to the ignition points of the solvents used (e.g. Example 1 of the aforementioned Patent Application: ignition point of decalin: 270° C., operating temperature: 80°–125° C.).

The preparation of special polyisobutylenes, which contain added functional groups but no carboxyl groups, is known from DE-OS 4 122 655 (Le A 28 403).

Rather, it is surprising that polyisobutylenes of high purity and containing carboxyl groups are obtained very selectively and with a very accurately adjustable carboxyl group content in a single-stage process by treating a diene-polyisobutylene copolymer with an excess of ozone in the presence of a solvent. In the course of this process the desired carboxylic acids are produced directly with a high degree of purity and with a defined functionality, without a second oxidizing agent having to be used. The use of ozone alone for the preparation of the carboxylic acids results in no further reaction products which would have to be removed by a purification step. The solutions obtained in the process according to the invention can be evaporated directly, and an almost complete recovery of the solvent is possible. The solutions can also be used directly as such for secondary reactions on the carboxylic acids, without impurities being transferred to the secondary products.

The process according to the invention is therefore carried out on a high molecular weight liquid or solid isobutylene-diene copolymer, which can be obtained by the copolymerization of isobutylene with 0.3 to 15 mole %, based on 1 mole of isobutylene monomer, of a conjugated $C_4$–$C_{14}$ diene which is optionally substituted in the 2- or 3 position but which contains hydrogen in at least one of the 2- or 3 positions, such as butadiene, isoprene, 2-chlorobutadiene-1,4, 2-bromobutadiene-1,4, pentadiene, hexadiene, 2-ethylbutadiene-1,3, 2-propylbutadiene-1,3, 2-phenylbutadiene-1,3, 2-methylpentadiene-1,3 or 3-propylhexadiene-1,3, for example, and which is commercially available under the name of butyl rubber. In this respect the diene is essentially present bonded in the 1,4-position. Small proportions of 1,4-bonding, which are present in all commercially available butyl rubbers and which cannot be completely suppressed, lead to proportions of lateral carboxyl groups which are likewise small. The preferred diene is isoprene. The production of butyl rubber is described in U.S. Pat. No. 2,356,128, for example.

The diolefines which effect crosslinking or branching are optionally polymerized in in amounts from 0.1 mole % to 10 mole %, preferably in amounts from 0.1 mole % to 5 mole %, based on 1 mole of isobutylene monomer.

Suitable diolefines include divinylbenzene or other divinyl aromatics such as divinyltoluene, divinylxylene, diisopropenylbenzene or divinylnaphthalene, for example.

The preferred diolefine is divinylbenzene.

Crosslinked or branched terpolymers of this type which are used according to the invention are insoluble and are likewise commercially available under the name of butyl rubber. They are described in U.S. Pat. No. 2,781,334, for example.

The isobutylene-diene copolymers used as starting materials for the process according to the invention, which may optionally be crosslinked or branched as mentioned above, have molecular weights Mn (number average molecular weight) of at least 20,000 (determined by gel permeation chromatography).

The molecular weight may vary within wide limits and preferably ranges from Mn 100,000 to 1,000,000 for starting polymers which are not crosslinked.

Crosslinked starting polymers are obtained from a molecular weight determination. Crosslinked butyl rubbers of this type can be characterized by their gel content. Their gel content here is between 50%–100%, preferably 60%–90%, ascertained by determining the traction soluble in cyclohexane.

In detail, the process according to the invention is carried out as follows:

The isobutylene-diene copolymer to be used as the starting material in each case is ozonized by means of a gaseous stream containing ozone, which is produced in a standard ozone generator from pure oxygen or from a dry gas mixture containing oxygen, such as air for example. The ozone content may be up to 15 volume %, preferably between 0.5 and 10 volume %.

The copolymer is dissolved or suspended in an organic solvent, preferably a saturated, optionally halogenated, aliphatic or cycioaliphatic hydrocarbon, or an ether, or an ester, or in a halogenated aromatic hydrocarbon. Suitable solvents include pentane, hexane, heptane, octane, cyclohexane, light petroleum, petroleum ether, tetrahydrofurane, methylene chloride, chloroform, tetrachloromethane, tetrachloroethane, chlorobenzene, butyl acetate or mixtures thereof, for example. Hexane, octane or methylene chloride are preferably used. The concentration of the copolymer in the solvent is selected so that the viscosity of the solution is suitable for dispersing the ozone carrier gas. The concentration is preferably between 5 weight % and 30 weight %.

However, in one preferred embodiment of the process according to the invention the starting material is not dissolved in the solvent before treatment with ozone, but is coarsely comminuted, in normal cutting mills for example, and is merely suspended in a corresponding amount of the solvent. The dissolution process then takes place during the treatment with ozone. This procedure eliminates a time-consuming dissolution step, and also eliminates solutions which are too highly viscous and which make it difficult to achieve thorough mixing with the ozone-containing gas. Moreover, the dissolution of the isobutylene-diene copolymer is considerably speeded up in the presence of ozone.

Another advantage of this procedure is that solvents can also be used in which the carboxylic acids obtained by the process are soluble, but in which the starting polymers are insoluble or only difficultly soluble.

This variant of the process is thus also suitable for the treatment with ozone according to the invention of crosslinked and therefore insoluble isobutylene-diene-diolefine terpolymers.

As stated in the introduction, the amount of ozone to be used may vary within certain limits. In detail, the amount depends upon the degree of unsaturation of the isobutylene-diene-copolymers which are used as the starting materials. It also depends on the desired content of carboxyl groups in the product of the process which is to be prepared according to the invention.

The degree of unsaturation of the starting materials is generally between 0.3–15 mole %, preferably 0.5–10 mole %, most preferably 0.5–5 mole %, per mole of monomer unit.

According to the invention, the ozone consumption per double bond in the starting material is between 1–10 moles, preferably 1–5 moles.

The total amount of ozone to be used in each case according to the invention is 0.25–180 weight %, most preferably 0.5–25-weight %, based on the starting material.

After treatment with ozone has been effected, the solution formed is evaporated, optionally after filtration to remove extraneous matter or small amounts of crosslinked fractions, the solvent being almost completely recovered. The solution may optionally be treated before filtration with a solid adsorbent, such as activated carbon for example, in order further to improve the colour of the final product. However, the solution may also be used as such, without an evaporation step, for other organic chemical reactions.

The final products from the treatment with ozone have a high degree of purity and a defined carboxyl functionality of 0.5 to 5 moles of carboxyl groups, preferably between 0.8 and 4 moles of carboxyl groups, per mole of polymer. The functionality can be ascertained by comparing the number average molecular weight Mn, which can be determined by methods for the absolute determination of molecular weight, e.g. gel permeation chromatography, with the acid number (in mg KOH per g polymer) obtainable by titration. The acid number of the products depends on the diene content in the copolymer and on the selected excess of ozone. As mentioned above, it falls between 2 and 250 mg KOH/g, preferably between 5 and 100 mg KOH/g, most preferably between 5 and 60 mg KOH/g.

By employing a sufficient excess of ozone, products can be obtained which have a carboxyl group content which corresponds to that calculated from the diene content, wherein it is assumed that in the case of dienes substituted in the 2- or 3 position, such as isoprene for example, each diene unit yields one carboxyl group, and in the case of dienes which are unsubstituted in the 2,3-position, such as butadiene for example, each diene unit yields two carboxyl groups. In the first case the presence of keto groups in the final product can be detected by the absorption at $1720\ cm^{-1}$ in the infrared spectrum of a neutralized sample. The carboxylate absorption associated with the carboxyl groups is at $1560\ cm^{-1}$. In samples which have not been neutralized the carbonyl and carboxyl absorptions overlap at 1720-1700 $cm^{-1}$.

EXAMPLES

Example 1

1 kg of isobutylene-isoprene rubber with an isoprene content of 2.1 mole % and a Mooney viscosity of 47 (ML8, 100° C.) (Polysar Butyl 402, a commercial product of Bayer AG) was comminuted into coarse pieces (about 2 cm diameter) and suspended in 4 liters of hexane. A stream of oxygen enriched with ozone (300 l/hour, amount of ozone about 10 g/hour) was introduced into the mixture with stirring at 15° to 25° C., until an acid number of 17 was obtained. The requisite time of introduction to obtain this value was 6 hours. The amount of ozone introduced was about 3 moles per mole of isoprene, based on the isoprene content in the butyl rubber. The solid fractions dissolved completely during the introduction. After flushing with nitrogen the solution was stirred briefly with 5 g of activated carbon, filtered, and the solvent was distilled off. A strong band at $1720\ cm^{-1}$ appeared in the IR spectrum of the residual colourless oil. After neutralization the absorptions of the keto group ($1720\ cm^{-1}$) and of the carboxylate groups ($1560\ cm^{-1}$) could be distinguished. After it had been freed from solvent under vacuum, the sample had a molecular weight Mn of 3600 (GPC analysis). The carboxyl functionality was calculated from the measured acid number of 17 mg KOH/g as 1.09 moles COOH per mole of polymer.

Example 2

1 kg of isobutylene-isoprene rubber with an isoprene content of 1.6 mole % and a Mooney viscosity of 51 (ML8, 125° C.) (Polysar Butyl 301, a commercial product of Bayer AG) was comminuted into coarse pieces (about 2 cm diameter) and suspended in 4 liters of methylene chloride. A stream of oxygen enriched with ozone (50 l/hour, amount of ozone about 4 g/hour) was introduced into the mixture with stirring at 10° to 15° C., until an acid number of 14 was obtained. The requisite time of introduction to obtain this value was 8 hours. The solid fractions dissolved completely during the introduction. After flushing with nitrogen the solution was stirred briefly with 5 g of activated carbon, filtered, and the solvent was distilled off. A strong band at 1720 cm$^{-1}$ appeared in the IR spectrum of the residual colourless oil. After neutralization the absorptions of the keto group (1720 cm$^{-1}$) and of the carboxylate groups (1560 cm$^{-1}$) could be distinguished. After it had been freed from solvent under vacuum, the sample had a molecular weight Mn of 4400 (GPC analysis). The carboxyl functionality was calculated from the measured acid number of 14 mg KOH/g as 1.08 moles COOH per mole of polymer.

Example 3

1 kg of isobutylene-isoprene rubber with an isoprene content of 2.1 mole % and a Mooney viscosity of 47 (ML8, 100° C.) (Polysar Butyl 402, a commercial product of Bayer AG) was dissolved in 5 liters of hexane at 40° C. A stream of oxygen enriched with ozone (300 l/hour, amount of ozone about 10 g/hour) was introduced into the viscous solution with stirring at 15° to 25° C., until an acid number of 17 was obtained. The requisite time of introduction to obtain this value was 6 hours. The viscosity decreased rapidly during the introduction. After flushing with nitrogen the solution was stirred briefly with 5 g of activated carbon, filtered, and the solvent was distilled off. A strong band at 1720 cm$^{-1}$ appeared in the IR spectrum of the residual colourless oil. After neutralization the absorptions of the keto group (1720 cm$^{-1}$) and of the carboxylate groups (1560 cm$^{-1}$) could be distinguished. After it had been freed from solvent under vacuum, the sample had a molecular weight Mn of 3600 (GPC analysis). The carboxyl functionality was calculated from the measured acid number of 17 mg KOH/g as 1.09 moles COOH per mole of polymer.

Example 4

1000 g of crosslinked isobutylene-isoprene rubber with an isoprene content of 2.3 mole a divinylbenzene content of 1.4 mole %, and a Mooney viscosity of 67 (ML8, 125° C.) (Polysar Butyl XL10000, a commercial product of Bayer AG) were comminuted into coarse pieces (about 2 cm diameter) and suspended in 4 liters of hexane. A stream of oxygen enriched with ozone (300 l/hour, amount of ozone about 10 g/hour) was introduced into the mixture with stirring at 15° to 25° C., until an acid number of 43 was obtained. The requisite time of introduction to obtain this value was 10 hours. The solid fractions dissolved completely during the introduction. After flushing with nitrogen the solution was stirred briefly with 5 g of activated carbon, filtered, and the solvent was distilled off. A strong band at 1720 cm$^{-1}$ appeared in the IR spectrum of the residual colourless oil. After neutralization the absorptions of the keto group (1720 cm$^{-1}$) and of the carboxylate groups (1560 cm$^{-1}$) could be distinguished. After it had been freed from solvent under vacuum, the sample had a molecular weight Mn of 3800 (GPC analysis). The carboxyl functionality was calculated from the measured acid number of 43 mg KOH/g as 2.9 moles COOH per mole of polymer. From a comparison of the relationship between the Standinger Index and the molecular weight, which was determined experimentally by HPGPC/dynamic pressure viscometry, and the Mark-Houwink relationship for linear polyisobutylene, it followed that the molecule had a branched long chain structure over the entire molecular weight range.

Example 5

1 kg of isobutylene-isoprene rubber with an isoprene content of 0.7 mole % and a Mooney viscosity of 45 (ML1+8, 100° C.) (Polysar Butyl 100, a commercial product of Bayer AG) was comminuted into coarse pieces (about 2 cm diameter) and suspended in 4 liters of n-octane. A stream of oxygen enriched with ozone (50 l/hour, amount of ozone about 4 g/hour) was introduced into the mixture with stirring at 0° C., until an acid number of 5.6 was obtained. The requisite time of introduction to obtain this value was 5 hours. The solid fractions dissolved completely during the introduction. After flushing with nitrogen the solution was stirred briefly with 5 g of activated carbon, filtered, and the solvent was distilled off. A strong band at 1720 cm$^{-1}$ appeared in the IR spectrum of the residual colourless oil. After neutralization the absorptions of the keto group (1720 cm$^{-1}$) and of the carboxylate groups (1560 cm$^{-1}$) could be distinguished. After it had been freed from solvent under vacuum, the sample had a molecular weight Mn of 11,000, a molecular weight Mw of 20,900, and a molecular heterogeneity U of 0.9 (GPC analysis). The carboxyl functionality was calculated from the measured acid number of 5.6 mg KOH/g as 1.1 moles COOH per mole of polymer.

Example 6

1 kg of isobutylene-isoprene rubber with an isoprene content of 2.7 mole % was comminuted into coarse pieces (about 2 cm diameter) and suspended in 4 liters of n-octane. A stream of oxygen enriched with ozone (50 l/hour, amount of ozone about 4 g/hour) was introduced into the mixture with stirring at 0° C., until an acid number of 21 was obtained. The requisite time of introduction to obtain this value was 15 hours. The solid fractions dissolved completely during the introduction. After flushing with nitrogen the solution was stirred briefly with 5 g of activated carbon, filtered, and the solvent was distilled off. A strong band at 1720 cm$^{-1}$ appeared in the IR spectrum of the residual colourless oil. After neutralization the absorptions of the keto group (1720 cm$^{-1}$) and of the carboxylate groups (1560 cm$^{-1}$) could be distinguished. After it had been freed from solvent under vacuum, the sample had a molecular weight Mn of 2800, a molecular weight Mw of 5300 and a molecular heterogeneity U of 0.9 (GPC analysis). The carboxyl functionality was calculated from the measured acid number of 21 mg KOH/g as 1.05 moles COOH per mole of polymer.

We claim:
1. A process for preparing polyisobutylene carboxylic acids with number average molecular weights of from 300 to 20,000 and having a content of carboxylic acid groups between 0.5 and 5 moles, based on 1 mole of polyisobutylene carboxylic acid, comprising reacting a high molecular weight isobutylene diene copolymer which contains from 0.3 to 15 mole % of diene per mole of isobutylene monomer, and which is optionally crosslinked or branched, with 0.3 to 50 mole % of ozone and in the presence of a solvent suitable for the polyisobutylene carboxylic acid which is formed.

2. The process of claim 1, wherein the isobutylene diene copolymer is crosslinked or branched.

3. The process of claim 2, wherein the isobutylene diene copolymer is crosslinked or branched by means of a diolefin.

4. The process of claim 3, wherein the isobutylene diene copolymer is crosslinked or branched by means of a diolefin in amounts of 0.1 to 10 mole %, based on 1 mole of isobutylene monomer.

5. The process of claim 1, wherein the temperature during the reaction is between −100° and 70° C.

* * * * *